(12) United States Patent
Lisitsyn et al.

(10) Patent No.: US 7,728,596 B2
(45) Date of Patent: Jun. 1, 2010

(54) METHOD AND DEVICE FOR SEA ELECTRICAL SURVEY OF OIL-AND-GAS DEPOSITS

(76) Inventors: Evgenij Dmitrievich Lisitsyn, ul. Budapeshtskaya, 15-2, Apt 58, St. Petersburg (RU) 192212; Andrej Vladimirovich Tulupov, ul. Kedrova, 21-2, Apt 50, Moscow (RU) 117036; Alexandr Arkadevich Petrov, ul. Bolshaya Monetnaya, 29, Apt 43, St. Petersburg (RU) 197101; Vladimir Eduardovich Kyasper, ul. Oleko Dundicha, 8-1 Apt 110, St. Petersburg (RU) 192283; Petr Yurevich Legejdo, ul. Lomonosova, 72 Apt 144, Irkutsk (RU) 664000

( * ) Notice: Subject to any disclaimer, the term of this patent is extended or adjusted under 35 U.S.C. 154(b) by 74 days.

(21) Appl. No.: 11/918,383
(22) PCT Filed: Jun. 15, 2006
(86) PCT No.: PCT/EA2006/000009
  § 371 (c)(1),
  (2), (4) Date: Oct. 12, 2007
(87) PCT Pub. No.: WO2007/068259
  PCT Pub. Date: Jun. 21, 2007

(65) Prior Publication Data
  US 2009/0085569 A1      Apr. 2, 2009

(30) Foreign Application Priority Data
  Dec. 15, 2005   (RU)   ............... 2005138935

(51) Int. Cl.
  *G01V 3/15*   (2006.01)
(52) U.S. Cl. ..................................... 324/365
(58) Field of Classification Search ............ 324/332, 324/334, 337, 344, 347, 350, 354, 357, 358, 324/360, 362, 365; 702/6, 7, 11
  See application file for complete search history.

(56) References Cited

U.S. PATENT DOCUMENTS

| 7,109,717 | B2* | 9/2006 | Constable | .................... 324/337 |
| 2008/0105425 | A1* | 5/2008 | MacGregor et al. | ..... 166/250.01 |

FOREIGN PATENT DOCUMENTS

| GB | 2390904 | 1/2004 |
| RU | 2236028 | 9/2004 |
| RU | 2253881 | 6/2005 |
| RU | 48645 | 10/2005 |

OTHER PUBLICATIONS

Constable et al., Marine Controlled-Source Electromagnetic Sounding 2. The Pegasus Experiment, Journal of Geophysical Research, vol. 101, No. B3, pp. 5519-5530, 1996.*

* cited by examiner

*Primary Examiner*—Kenneth J Whittington
(74) *Attorney, Agent, or Firm*—Aleksandr Smushkovich (57) ABSTRACT

A sea electrical survey method for hydrocarbon deposits, situated under seabed not exceeding 10 meters of depth, is disclosed, comprising: providing a plurality of multi-channel bottom systems with receiving lines having at least three electrodes and capable to register electromagnetic signals, excitation devices generating a series of computer-controlled alternating-sign pulses, a horizontally positioned dipole, synchronizing the excitation devices and bottom systems, submerging the systems upon the seabed along a predetermined direction, aligning the receiving lines, moving the dipole within the survey zone, excitation of the pulses, registering signals, measuring the potentials difference and the spatial derivatives of the signals during the pulses and the pauses, recording data, analyzing the data with accounting the fields behavior in time and in space simultaneously, determining the environment resistivity and environment polarizability based on a predetermined mathematical model, and compiling the deposit prognosis. Preferable distance, time, and angular parameters are specified.

9 Claims, 6 Drawing Sheets

METHOD AND DEVICE FOR SEA ELECTRICAL SURVEY OF OIL-AND-GAS DEPOSITS

CROSS-REFERENCE TO RELATED APPLICATIONS

This application is a U.S. national phase application of an international PCT application PCT/EA2006/000009 filed on 15 Jun. 2006, entitled "METHOD AND DEVICE FOR MARINE ELECTRICAL EXPLORATION OF OIL AND GAS FIELDS", published as WO/2007/068259, whose disclosure is incorporated herein in its entirety by reference, which PCT application claims priority of a Russian Federation patent application RU/2005138935 filed on 15 Dec. 2005. As applicants believe, the present application contains no substantial new matter as compared with the aforesaid PCT application.

FIELD OF THE INVENTION

The invention relates to the field of geophysical exploration of under-seabed geological formations, in particular, to geo-electrical survey and prognosis of presence of hydrocarbon deposits in a transit shelf zone with the depth of seawater not exceeding 10 meters.

BACKGROUND OF THE INVENTION

Nowadays different methods of sea exploring for location of hydrocarbons deposits are widely used. These methods are application-dependent and commonly employ excitation electromagnetic field pulses acting upon the seabed, subsequent registration of the changes in the near-bottom strata electromagnetic parameters, and analysis of the obtained data for detection of existing anomalies and determination of their nature. Such exploring is typically carried out using different research complexes or sets of apparatus and equipment (herein further called a research complex—RC), as, for instance, taught in RU 2236028, 2004; SU 1122998, 1984; SU 1798666, 1996; SU 1434385, 1988; U.S. Pat. No. 4,298,840, 1981; U.S. Pat. No. 4,617,518, 1986.

There is a well-known method of sea electrical survey on a drifting ice-floe provided by means of a research complex comprising excitation and receiving devices, a source of alternating-sign periodical current pulses and a data processing system (taught in RU2069375, 1993). The essence of this method is that excitation and receiving devices are placed upright under ice in a water layer. The feeding (excitation) pulses are provided by the aforesaid source of several dozens amperes by means of ERS 72 or another system, the data processing is provided by means of a digital electrical survey system of a CESS type. The section profiling is completed with a fixed distance between the points of excited (irradiated) and thereafter received (reflected) signals, wherein the excitation is provided by the alternating-sign pulses. According to the method, only the vertical component of the electric field is measured. However, this method can't be used for measurements during movement of the vessel, as it is based on excitation of a water layer immovable in relation to the ice-floe. Moreover, this method may not be employed in the case of relatively small depths where the free drift of the ice-floe is difficult.

Another prior art apparatus is known for measurement of the seabed resistivity (as described in GB 2390904) by means of vertical electric and magnetic dipoles, placed at a towed underwater device, and a set of bottom systems. However, this device is inapplicable in the condition of shallow water because of installation difficulties. Moreover, the method utilizing the aforesaid apparatus is insufficiently accurate, since it doesn't fully deploy the analysis of seabed strata polarization characteristics.

There is a known method of induced polarization (IP), which is more universal and promising for survey carried out from sea vessels (e.g. taught in RU 2236028; RU 2253881, SU 1798666; SU 1434385; U.S. Pat. No. 4,298,840; U.S. Pat. No. 4,617,518). This method allows to take into account both conductivity and polarizability (polarization ability) of the seabed strata during the survey stage of "building the profile" of the strata.

There are also known prior art methods and devices described in patents RU 2236028 (that teaches to use unipolar current pulses and a generator dipole located along the axis of the measurement line) and RU 2253881, wherein the water surroundings are excited by means of an electromagnetic excitation horizontal generator line, towed behind the vessel. The measurement of primary (excited) and secondary (reflected) signals is carried out by another electromagnetic receiving line, towed by the vessels, which line having a length in the range of from 500 up to 1000 m. This device is practically inapplicable in the shallow water conditions, where the vessel, which the installation is based upon, ought to be situated at a sufficient distance from the shore in a predetermined depths zone. Moreover, such method restricts the possibility of obtaining data, since it contemplates only two options: either excitation of the surroundings at a fixed distance symmetrical relatively the probe point, or immediately at the probe point with two measurement devices.

There is another known apparatus (taught in SU 1434385, 1988), including a feeding line placed on the seabed, which line has a length from 5 to 10 times greater than a prescribed research depth. A generator is connected to this line, and measurement gauges are connected to the measurement device. After adjustment of the device and compensation of the natural field signals and proper polarization of the gauges electrodes, the electric field is excited in the line by passing the current pulses through, and at the end of each pulse and after a predetermined time interval, one measures corresponding signals of induced polarization, and on the basis of the obtained results one performs the profile section modeling. The disadvantage of this method is its low productivity caused by relatively small measurement area, determined by the length of the feeding line.

The closest prior art solution to the instant invention is a research complex (RC) disclosed in a Russian Federation patent RU0048645. The complex comprises a vessel where a generator and a block of excitation field formation (BEFF), that allows generating pulses in a discrete mode. The complex also comprises a measurement device and auxiliary devices. BEFF is connected with the vertical dipole submerged into water with feeding electrodes. A lower end of the dipole is positioned at a distance not exceeding 100 m from the seabed.

A set of bottom systems (BS) is employed for the signals registration. For this purpose typical electrical or magnetic bottom systems with flexible arms are used. Receiving electrodes are mounted on the flexible arms, fixed to the BS. These bottom systems are situated in such a manner that at least three systems would be placed in the area of probable deposits, and a predetermined number of systems would be placed beyond it.

The RC includes, in particular, a number of auxiliary devices, such as a block of self-emersion of the bottom systems; a block of registration and processing (BRP); a non-radiating ballast device, ensuring dissipation of the generator's power in the intervals between the pulses, which ballast device comprising pairs of receiving electric dipoles oriented in different directions and having equal moments; the apparatus for determination of the vessel location, the sea depth etc.

The RC employs the following survey method: before the installation of the bottom systems, when the vessel reaches the beginning point of a profile to be surveyed, the clocks of BEFF and the bottom systems are synchronized. The bottom systems are then installed along the profile in predetermined prescribed points, so that at least three systems are situated in the area of probable deposit, and the rest of BS is situated beyond its bounds.

After installation of the systems, the vessel is positioned at a distance, equal to at least the sea depth, from the profile beginning, the generator line is descended upright, so that the lower feeding electrode would be disposed at a distance not exceeding 100 m from the seabed. Thereafter, the BEFF is activated and forming bidirectional electromagnetic pulses with pauses, which pulses cause polarization of the seabed strata. During the pauses, the vessel generator is connected to the ballast device that reduces surges of the load current.

BRP then provides the measurement of the dipole's current with a predetermined discreteness established by a pre-programmed computer, both during the pulse and in the pause between the two subsequent pulses, determining the beginning and the ending time of each pulse. The bottom systems register the signals with the aforesaid predetermined discreteness, both during the pulse and in the pause between the pulses. Based upon the obtained data, that characterizes both conductivity and polarizability of the seabed strata, one builds a section profile, and, analyzing the profile, one makes a conclusion about presence or absence of oil-and-gas deposits.

The above solution has however certain shortcomings. Particularly, it is practically impossible to use in the aforementioned RC in a transit shelf zone with a depth not exceeding 10 meters, since a typical vertical generator line may have a length in the range from several dozens up to several hundreds meters that is much greater than the depth.

BRIEF DESCRIPTION OF THE INVENTION PRINCIPLES AND STRUCTURAL RELATIONS

The present invention, therefore, is dedicated to the creation of a research complex (RC) and survey method operable in the aforesaid transit shelf zone, allowing to obtain data based both on the strata conductivity and their polarization characteristics.

The inventive method is characterized in that a generator line is horizontally towed behind a vessel at the sea surface, excitation of electromagnetic signals is provided by a generator and a block of excitation field formation supplying alternating-sign pulses of a substantially rectangular form in time series with fixed periods, the signals evolvement in time is registered by means of a predetermined number of multi-channel bottom systems, equipped with receiving electromagnetic lines, each receiving line having at least three electrodes located at a substantially equal distance in the preferable range of from 50 to 500 meters from each other, one registers the potentials differences and their spatial derivatives, both at the moment of the current passage and in its absence, and during the signals analysis one takes into account the change of the signals in time and in space, and one determines the resistivity parameter of the strata surveyed and the polarization parameter of the strata.

The inventive RC comprises a predetermined number of multi-channel bottom systems, equipped with electromagnetic receiving lines attached to the bottom systems, having at least three electrodes located at a substantially equal distance in the preferable range of from 50 to 500 meters from each other, which receiving lines are capable to register electromagnetic signals $\Delta U$ as well as their spatial derivative $\Delta^2 U$; a transportation unit (a vessel); a block of excitation field formation (BEFF) mounted on the vessel; a discrete bidirectional pulses generator, associated with the BEFF and mounted on the vessel; a non-radiating ballast device associated with the generator and mounted on the vessel; a mounted on the vessel device for reading and recording information from the bottom systems for registration of the place and time of generation of current pulses and initialization of the bottom systems; a horizontal dipole generator line towed by the vessel along the water surface.

The simultaneous examination of $\Delta U$ and $\Delta^2 U$ allows for more complete studying the spatial-timing field structure, and increases the reliability of determination of all the profile section parameters. It also allows for simultaneously obtaining several survey profiles.

Figure 1:
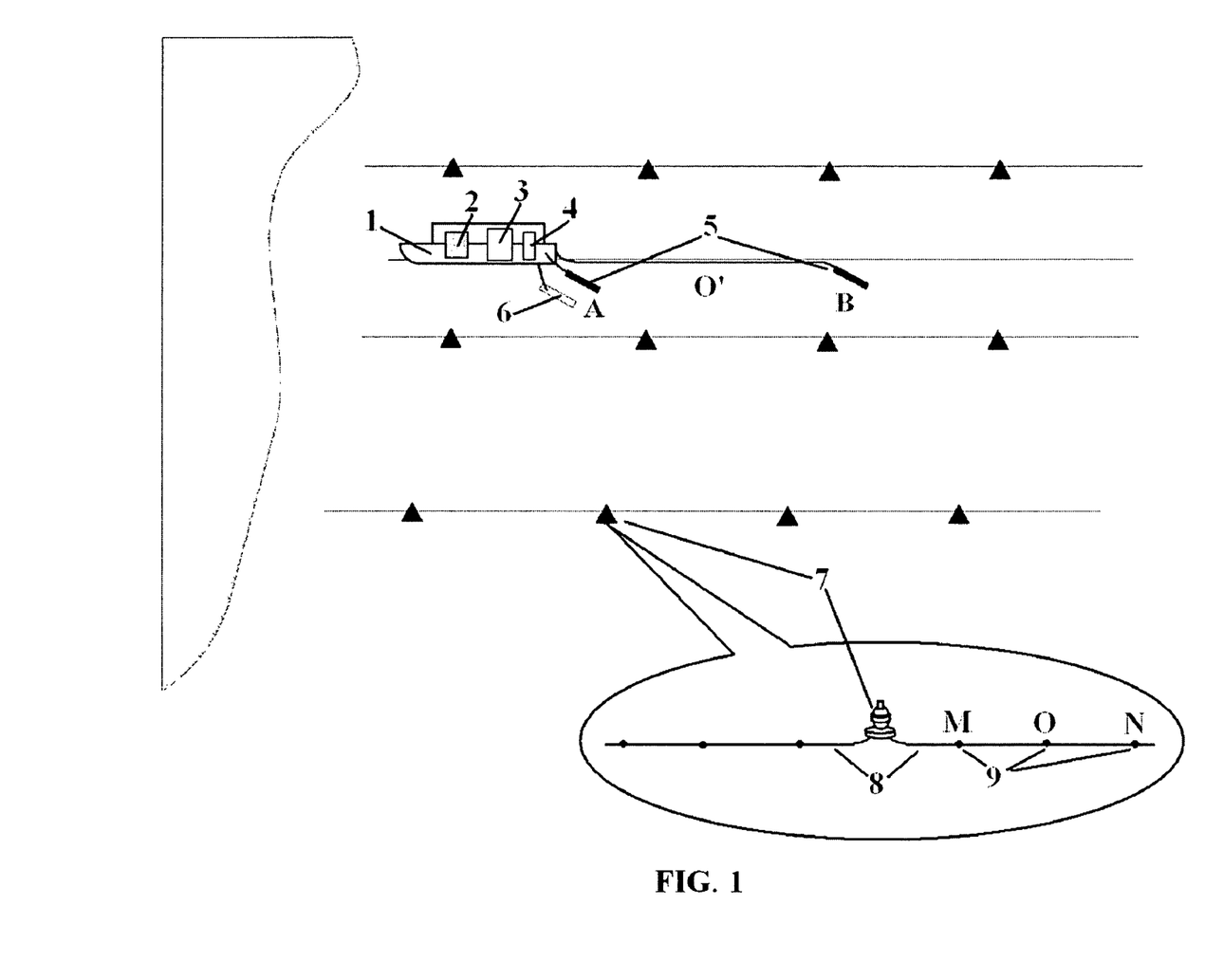
FIG. 1 is a general schematic view of the inventive research complex where the vessel moves in parallel with the receiving lines, according to an embodiment of the present invention.
Figure 2:
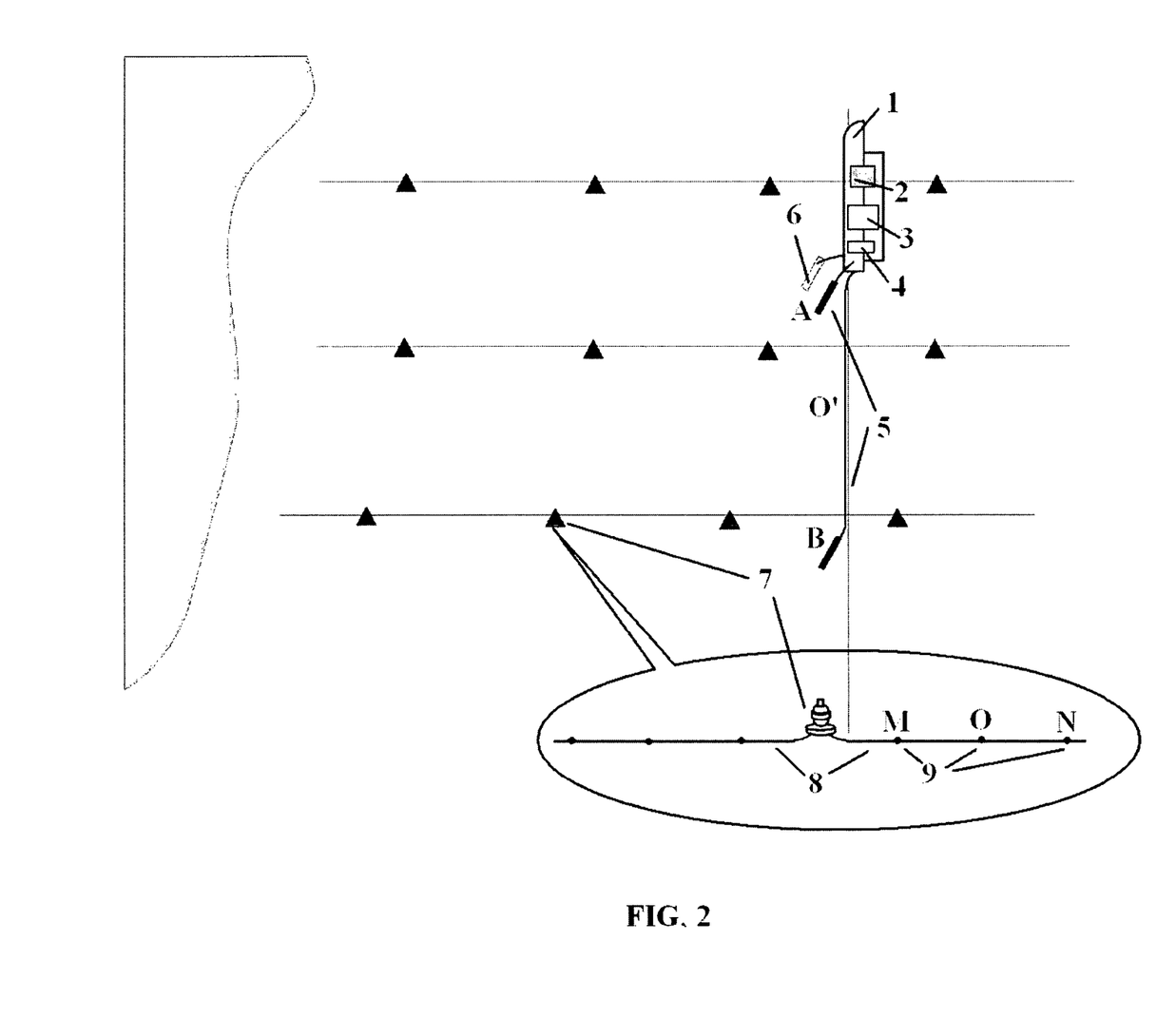
FIG. 2 is a general schematic view of the inventive research complex where the vessel moves at a right angle to the receiving lines, according to an embodiment of the present invention.

The aforesaid receiving lines are aligned in parallel or perpendicularly to the excitation line, along which line the dipole generator line is towed (as shown in FIGS. 1 and 2). The particular array of the receiving electrodes is determined by the specific peculiarities of the survey area. The combination of the discrete pulses generator, the dipole generator line, and the receiving lines with the registering electrodes ensures receiving data containing information not only on the resistivity of the deep-sea strata layers, but also on their polarization characteristics, allows obtaining more qualitative prognosis on probable resources of carbohydrate raw materials in the surveyed zone.

The invention provides the possibility to make the prognosis based on measurements of the electromagnetic fields parameters both in timing and spatial areas simultaneously, that essentially raises the reliability of determination of the environment parameters (resistivity and polarization) used for further analysis. Moreover, the present invention is advantageous, since it makes use of immovable registration lines, which essentially reduces the disturbances and raises the accuracy of measurements in comparison with moving receiving electrodes typically employed in prior art devices. The invention is exemplarily illustrated in the following drawings.

BRIEF DESCRIPTION OF THE DRAWINGS

In FIGS. 3-6, the solid lines are used to illustrate the calculation of a strata model with deposits and altered strata formations, whereas the dashed line indicates the background.

DESCRIPTION AND OPERATION OF PREFERRED EMBODIMENTS

While the invention may be susceptible to embodiment in different forms, there are shown in the drawings, and will be described in detail herein, specific embodiments of the present invention, with the understanding that the present disclosure is to be considered an exemplification of the principles of the invention, and is not intended to limit the invention to that as illustrated and described herein.

The following designations are used in FIG. 1 and FIG. 2 to describe an exemplary preferred embodiment of the inventive research complex (RC): a vessel preferably of a small size (1), having on board: a pulse generator (2), a block of excitation field formation (BEFF) (3), and a block for initializing, registration, and processing of data (BRP) (4), an electromagnetic dipole generator line (5), a ballast device (6), a plurality of bottom systems (7), each equipped with an electromagnetic receiving line (8) with receiving electrodes (9). The receiving line 8 has footing ends (not illustrated) fixedly attached to the respective bottom system 7. In a preferred embodiment, the length of the receiving line is chosen from the range of from 100 up to 3000 meters.

According to the inventive method, the electrical survey of the seabed is performed for a transit shelf zone with a depth in the range of from 0 up to 10 meters for survey profiles that may be particularly located both along the shore line or at the right angle to it. The characteristics and structural relations of the aforementioned enumerated elements are generally described hereinabove.

The research complex operates as follows. Before the beginning of operation, one arranges the receiving lines 8 by means of auxiliary vessels (not illustrated), preferably of a small size, along the survey profile (SP) in such a way that the receiving electrodes 9 are located at predetermined specific profile points. The positions of electrodes 9 are controlled according to data of receiving-indicators (not illustrated) associated with the GPS system. Before the placement on the seabed, the bottom systems 7 are initialized by the BPR 4, and the clocks of the BS 7 are synchronized with the clock of the BEFF 3, based on etalon signals (e.g. PPS signals of the GPS). One or several profiles may be simultaneously equipped with the bottom systems 7 associated with the receiving lines 8. A predetermined number of the bottom systems may be placed at zero depths (at the shore).

When the arrangement of the bottom systems is completed, the vessel 1 moves to a predetermined initial point of an excitation profile (EP), whose direction may be parallel with the SP direction or be perpendicular to it.

The generator 2 feeds the BEFF 3, which is actuated for forming a fixed-period series of pulses of a rectangular shape with alternating polarity, predetermined duration and on-off timing ratio (a ratio between the pulse time and the pause time in a given periodic pulse sequence), that causes a polarization effect upon the shelf strata. The duration of pulses and pauses is typically chosen from 0.5 to 16 sec based on the particular survey task, and details of the RC being deployed.

During the pauses, the non-radiating ballast device 6 is typically switched to connect with the generator 2 that reduces the surges of load currents of the generator.

The dipole generator line 5 receives the pulses substantially from the BEFF 3, and generates excitation electromagnetic signals irradiating the surrounding environment, including the strata. During its operation, the generator line 5 is towed by the vessel 1 along the sea surface.

The BRP 4 measures the current in the dipole 5 with a predetermined discreteness established by a preprogrammed computer (not illustrated) associated with the BRP 4, both during the pulse and the pause between two sequential pulses with fixation of the beginning time and the ending time of each pulse. At the same time, the bottom systems 7 register and memorize the time series of data, both on the potentials difference between the electrodes ($\Delta U$) and the secondary differences ($\Delta^2 U$), being the analogue of the spatial derivative of the field.

After the end of the EP, the receiving lines 8 and the bottom systems 7 are lifted upon the board of the vessel 1, the information from the bottom systems is re-recorded into the BRP 4 for subsequent processing and the operation cycle is repeated.

The obtained results are further processed, while the field information, gotten during both the current pulse passage and the pause between the pulses, is used for interpretation during further mathematical modeling. The modeling allows for extracting information supplied by the signals measured and recorded by the bottom systems 7, which information characterizes changes of the resistivity parameter and the induced polarization parameter varying with the depth of the strata bedding.

For evaluation of the method prospects the following mathematical modeling was implemented. Exemplarily, the following initial data were entered: the sea depth is 5 m; the length of a horizontal electric dipole (HED) generating line with a center O', (towed at the surface) is 500 m; the amount of electric current is 100 A. The measuring line comprises three electrodes M-400 m-O-400 m-N, wherein the electrode O is the installation center of the line and the electrodes M and N are respectively remote from the electrode O in two opposite directions.

The environment model, emulating the sea hydrocarbon deposits, used for the theoretical calculations, consists of 5 layers. The parameters of each layer of the model were determined according to the Cole-Cole formula:

$$\rho_j^\omega = \rho_j^0 (1-\eta_j) \bigg/ \left(1 - \eta_j \frac{1}{1+(-i\omega\tau_j)^{c_j}}\right),$$

wherein $\rho^\omega$—the electrical resistivity at the frequency $\omega$, $\eta$—the polarizability, $\tau$—the time constant, c—the exponential quantity, j—the layer number. The layers parameters are listed in the Table:

| Layer | Parameters | | | | |
|---|---|---|---|---|---|
| number | ρ, Ωm | η, % | τ, sec | c | h (thickness, m) |
| 1 | 0.3 | 0 | — | — | 5 |
| 2 | 1 | 0.5 | 0.1 | 0.5 | 100 |
| 3 | 1 | 5 | 1 | 0.5 | 1900 |
| 4 | 50 | 0 | — | — | 100 |
| 5 | 1 | 0.5 | 0.1 | 0.5 | 100 |

The theoretical calculations are accomplished for two measurement variants. In variant 1 (illustrated in FIG. 1), the HED generator line 5 and the profile with the bottom systems 7 are disposed in parallel, distances OO' were sequentially chosen equal to 500, 1000, and 1500 m (shown in FIGS. 3, 4). In variant 2 (illustrated in FIG. 2), the HED moves along the profile at the right angle to the line MON, that crosses it at a distance of 1000 m, the distances between the cross point and the center O' were sequentially chosen equal to 250, 500, 1000 m (shown in FIG. 5).

According to the aforesaid model, the following values were calculated: the signals ΔU (illustrated in FIG. 3) between the electrodes M and N and the ratio $\Delta^2 U/\Delta U$ (illustrated in FIG. 4), where $\Delta^2 U$ is the difference between the signals, measured at the ends of electrodes MO and ON (see also FIGS. 1 and 2).

Figure 3:
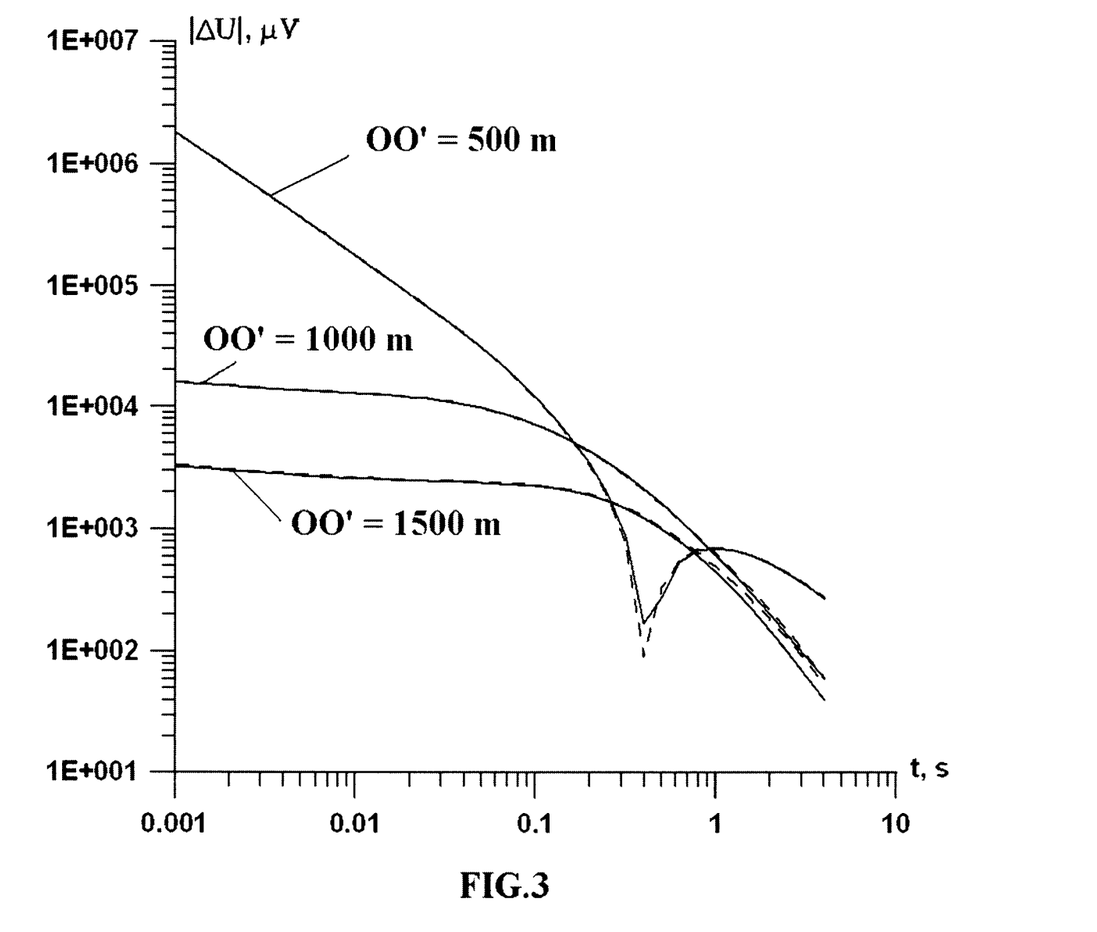
FIG. 3 is a graph, illustrating the dependence of the voltage $\Delta U$ between the electrodes M and N upon the measurement time for different offsets OO' (see FIG. 1) for the parallel mutual orientation of the generator dipole with the line of the receiving electrodes.
Figure 4:
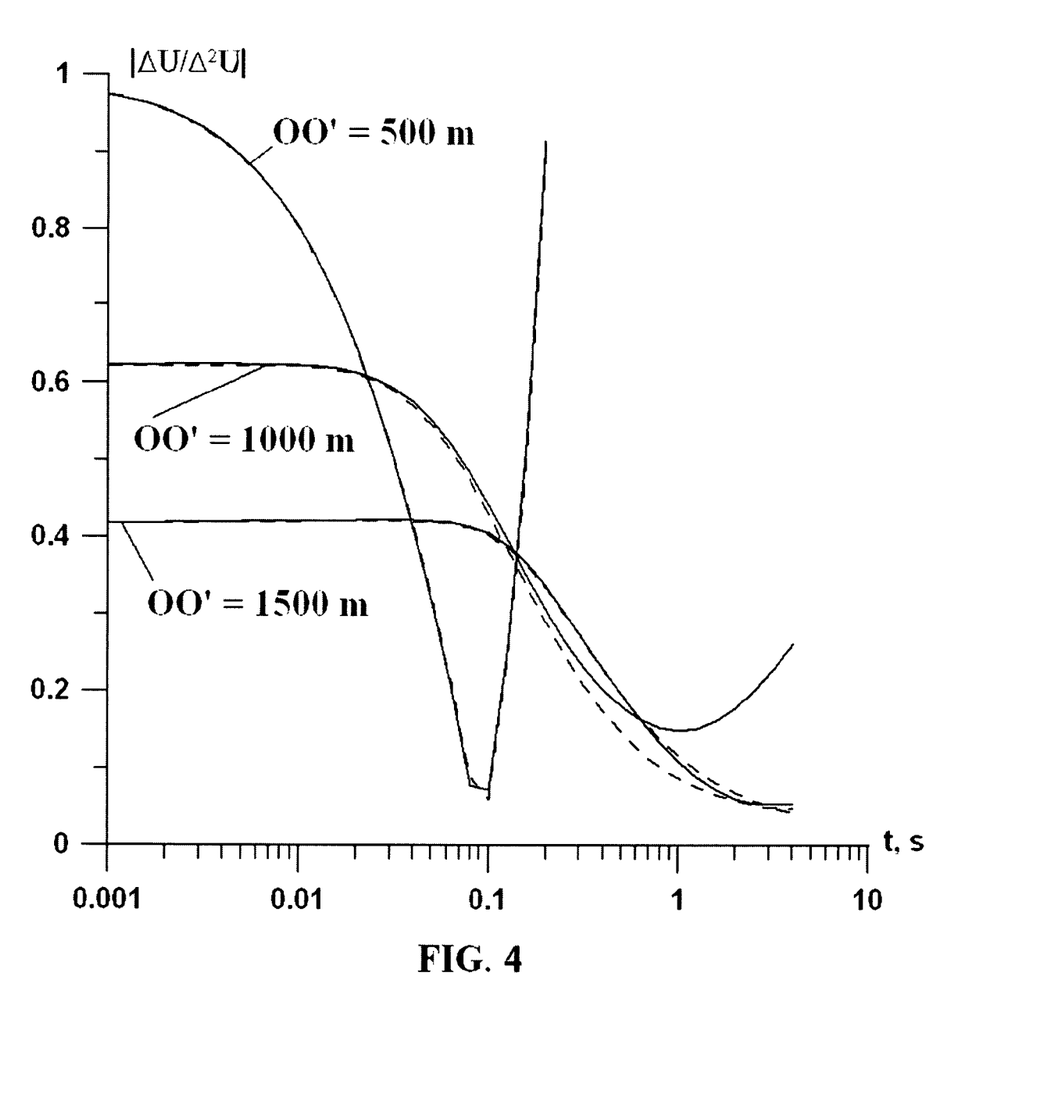
FIG. 4 is a graph, illustrating the dependence of the ratio $\Delta^2 U/\Delta U$ (where $\Delta^2 U$ is the difference between the signals measured at the pairs of electrodes MO and ON), upon the measurement time for different distances offsets for the parallel mutual orientation of the generator dipole with the line of the receiving electrodes.
Figure 5:
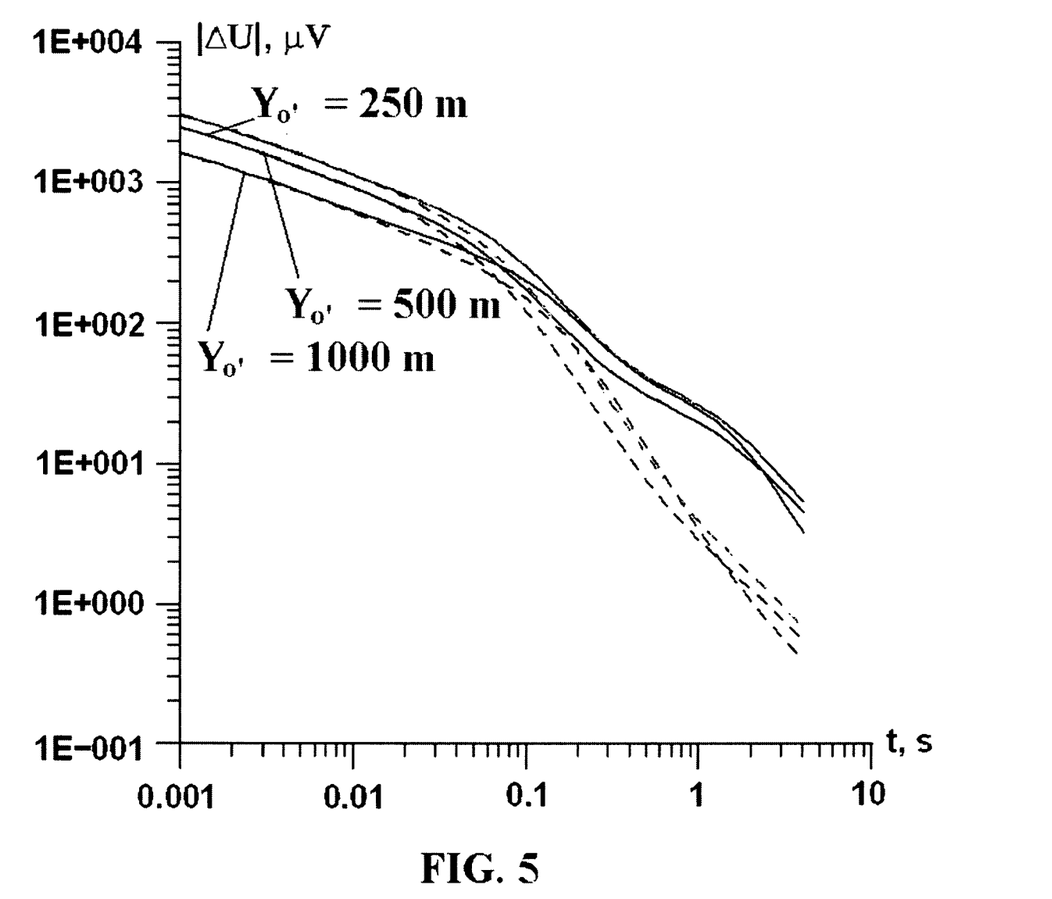
FIG. 5 is a graph, illustrating the dependence of the voltage ΔU between the electrodes M and N upon the measurement time for $X_o$, coordinate of the centre of the generator dipole, equal to 1000 m, and for different $Y_o$, coordinates of the centre for the perpendicular mutual orientation of the generator dipole with the line of the receiving electrodes.
Figure 6:
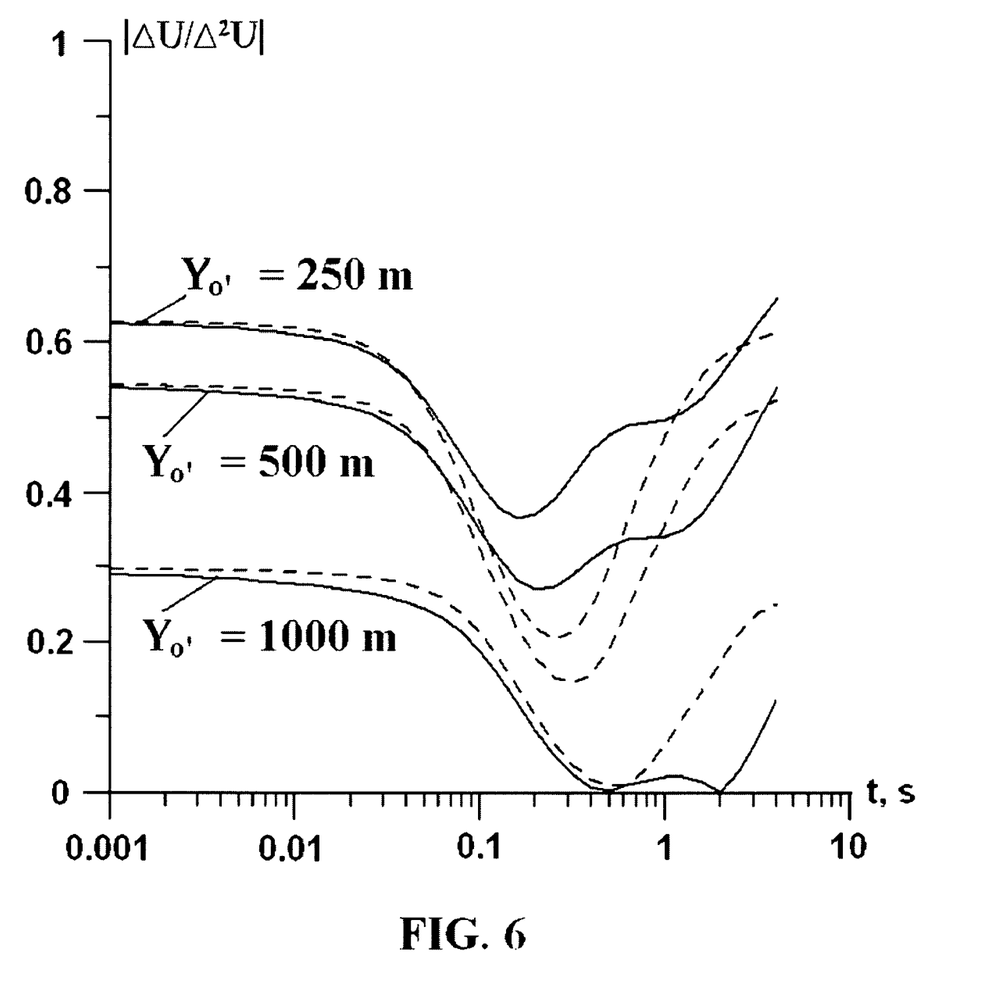
FIG. 6 illustrates the dependence of the ratio $\Delta^2 U/\Delta U$ (where $\Delta^2 U$ is the difference between the signals measured on the pairs of electrodes MO and ON) from the measurement time for $X_o$, coordinate of the centre of the generator dipole, equal to 1000 m, and for different $Y_o$, coordinates of the centre for the perpendicular mutual orientation of the generator dipole electrode with the line of the receiving electrodes.

The results are shown in FIGS. 3 and 4 for the parallel arrangement of the HED and the measurement line, and in FIGS. 5 and 6 for the perpendicular arrangement. The solid lines represent the model with the deposit and changed strata; the dashed line represents the background. The illustrated data obtained during the change of the distance show an anomalous zone appeared in the signals in different ways. The use of the wide spatial-timing area enables to reconstruct the profile section both according to the resistivity and to the polarization parameters.

INDUSTRIAL APPLICATION

The above mentioned results show the possibility of obtaining a set of strata characteristics using the inventive RC and its application to the survey of hydrocarbon deposits in the conditions of a transit shelf zone that enables to improve prognosis and predictions on the presence/absence of the deposits under the seabed in a surveyed region. The use of the inventive method combined with data of other geophysical methods allows to increase the reliability of determination on the presence of hydrocarbon deposits in the region, and thereby to raise success of the exploration drilling.

We claim:

1. A method for sea electrical survey of hydrocarbons deposits, situated under seabed strata in a transit shelf zone with a depth not exceeding 10 meters, comprising the steps of:
   providing a plurality of multi-channel bottom systems placed onto the seabed in the survey zone and in proximity thereof, said bottom systems equipped with receiving lines each having at least three electrodes located at a predetermined substantially equal distance from each other, said bottom systems capable to register and measure electromagnetic signals;
   providing excitation means for excitation of electromagnetic signals, said excitation means capable to generate a fixed-period series of alternating-sign electromagnetic pulses substantially of a rectangular shape with a duration and an on-off time ratio controlled by a preprogrammed computer;
   providing a dipole generating means associated with the excitation means and substantially horizontally positioned;
   synchronizing the operation of said excitation means and said bottom systems;
   submerging and placing said bottom systems upon the seabed along a predetermined survey profile direction;
   aligning said receiving lines with the electrodes at a predetermined angle relatively to the survey profile direction;
   moving said dipole means substantially horizontally within the survey zone in a predetermined excitation direction, substantially along the sea surface;
   controllable excitation of the series of said pulses within said excitation means and said dipole means during said moving;
   registering electromagnetic signals by the receiving lines;
   measuring the potentials difference and the spatial derivatives of said registered signals both during the current pulses passage and during the pauses and recording the measured data substantially by the bottom systems;
   analyzing said data taking into account the fields behavior in time and in space simultaneously;
   determining both the environment resistivity and environment polarizability characteristics based on the data analysis, and utilizing a predetermined mathematical model of the strata profile; and
   compiling prognosis on the hydrocarbons deposits presence based at least on anomalies of said resistivity and strata polarizability characteristics.

2. The method according to claim 1, wherein said distance between the electrodes being in the range of from 50 to 500 meters.

3. The method according to claim 1, wherein said duration of the electromagnetic pulses and corresponding pauses being in the range of from 0.5 seconds to 16 seconds.

4. The method according to claim 1, wherein said mathematical model calculating said resistivity and said polarizability characteristics based on the Cole-Cole formula as follows:

$$\rho_j^\omega = \rho_j^0 (1-\eta_j) \bigg/ \left(1 - \eta_j \frac{1}{1+(-i\omega\tau_j)^{c_j}}\right),$$

wherein $\rho^\omega$ represents the resistivity at the frequency ω, η represents the polarizability, τ represents the time constant, c represents the exponential quantity, and j represents the layer number.

5. The method according to claim 1, wherein said predetermined angle being ether 90.degree or 180.degree.

6. A research apparatus complex for sea electrical survey of hydrocarbons deposits, situated under seabed strata in a transit shelf zone with a depth not exceeding 10 meters, comprising:
   a sea vessel;
   a generator installed on the vessel;
   an excitation field formation block installed on the vessel and associated with the generator, said excitation field formation block capable to generate a fixed-period series of alternating-sign electromagnetic pulses of a rectangular shape with a duration and an on-off time ratio controlled by a preprogrammed computer;

a horizontally disposed dipole associated with and towable by the vessel along a survey profile located in said transit zone, said dipole substantially connected with the excitation field formation block;

a plurality of multi-channel bottom systems placed onto the seabed in said transit zone and in proximity thereof, said bottom systems equipped with receiving lines each having at least three electrodes located at a predetermined substantially equal distance from each other; and initialization and data processing means for initialization of the bottom systems and the dipole, and for registration of the place and time of generating said pulses and registration and processing of data obtained from said receiving lines;

wherein the research complex characterized in that the bottom systems measure both the electric field potentials difference and the electric field spatial derivative along the survey profile.

7. The research apparatus complex according to claim 6, further including a non-radiating ballast device associated with said generator.

8. The research apparatus complex according to claim 6, wherein said distance between the electrodes being in the range of from 50 to 500 meters.

9. The research apparatus complex according to claim 6, wherein the length of said receiving lines being in the range of from 100 to 3000 meters.

* * * * *